United States Patent [19]
Hutson

[11] Patent Number: 4,472,903
[45] Date of Patent: Sep. 25, 1984

[54] FISHING WEIGHT

[76] Inventor: Duane Hutson, 1315 Country Club Prado, Coral Gables, Fla. 33134

[21] Appl. No.: 248,942

[22] Filed: Mar. 30, 1981

Related U.S. Application Data

[63] Continuation-in-part of Ser. No. 114,895, Jan. 24, 1980, Pat. No. 4,279,092.

[51] Int. Cl.³ ............................................. A01K 93/00
[52] U.S. Cl. .................................. 43/44.91; 43/44.93
[58] Field of Search ................... 43/44.90, 44.91, 44.93

[56] References Cited

U.S. PATENT DOCUMENTS

| | | | |
|---|---|---|---|
| 2,077,184 | 4/1937 | Rader et al. | 43/44.87 |
| 2,529,179 | 11/1950 | Oberholtzer | 43/44.91 |
| 2,556,932 | 6/1951 | Morrissey | 43/44.91 |
| 2,807,907 | 10/1957 | Brite | 43/44.91 |
| 3,069,802 | 12/1962 | Olsen et al. | 43/44.95 |
| 3,077,049 | 2/1963 | Ward | 43/44.9 |
| 3,192,662 | 7/1965 | Hoyle | 43/44.91 |
| 3,293,792 | 12/1966 | Bittaker | 43/44.89 |
| 3,557,486 | 1/1971 | Wright | 43/44.89 |
| 3,672,087 | 6/1972 | Milburn | 43/44.91 |
| 3,949,513 | 4/1976 | Dmytriw | 43/44.93 |

*Primary Examiner*—Nicholas P. Godici
*Assistant Examiner*—M. Jordan
*Attorney, Agent, or Firm*—Robert J. Van Der Wall

[57] ABSTRACT

A fishing weight or sinker is disclosed which has an axis, essentially coincident with the fishing line on which it is used. The main body of the weight is comprised of a material having a specific gravity substantially greater than one, and includes an axial channel with a first cross sectional configuration extending from a first end thereof, and opening into an enlarged channel portion at a second end with a second cross sectional configuration. A bushing is exteriorly sized and configured for press fitted engagement within the length of the two channel portions and includes an interior screwthreaded fore portion extending from the first end to a tapered portion, somewhat inward of the second end which terminates in a keyhole slot opens radially outward at the second end in alignment with coincident slots opening radially outward through the length of the bushing and main body. A longitudinally slotted screw core including tapered inner end side portions is engageable in the bushing bore in a manner whereby a fishing line engaged therethrough may be selectively secured or released relative to the weight by proper rotational actuation of an outward extension of the core at the first end.

20 Claims, 8 Drawing Figures

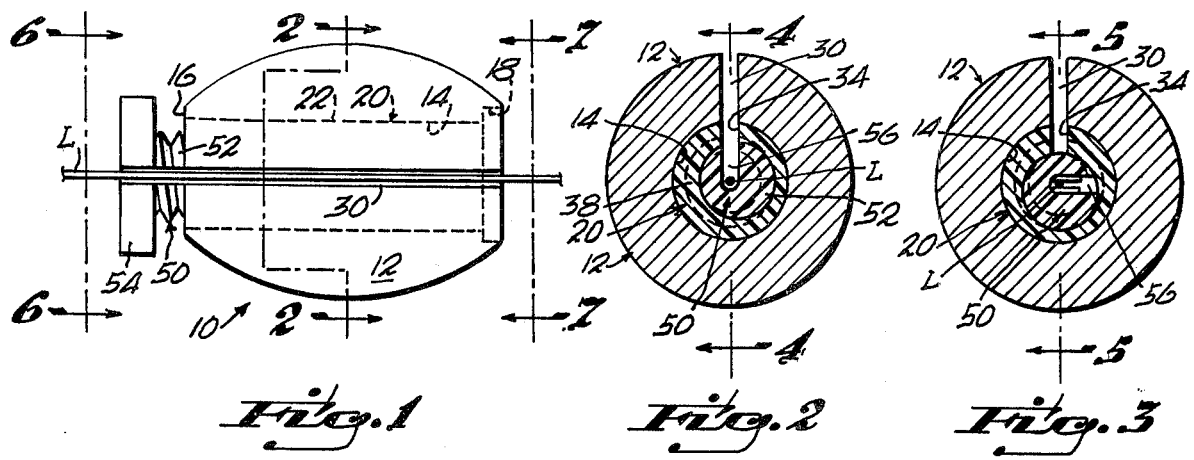
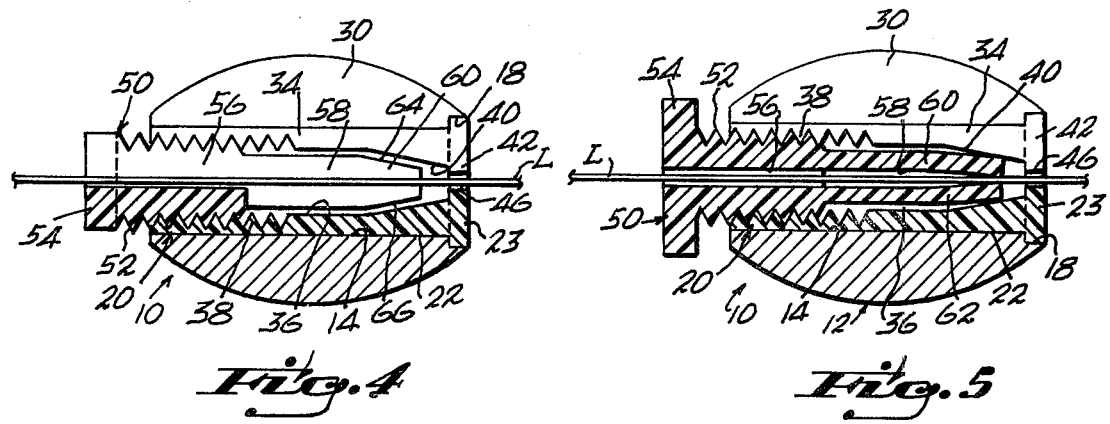
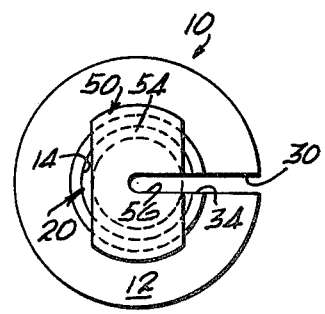
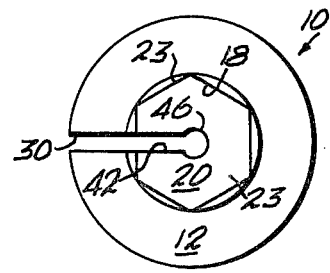
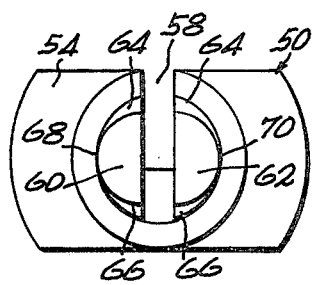

FISHING WEIGHT

CROSS REFERENCE TO OTHER APPLICATION

This is a continuation-in-part of my co-pending patent application, entitled "Fishing Weight" Ser. No. 114,895, filed Jan. 24, 1980 and now U.S. Pat. No. 4,279,092 issued July 21, 1981.

FIELD OF THE INVENTION

This invention pertains to fishing accessories, and, more particularly, to fishing weights which are selectively attached to and detached from a fishing line to submerge a baited hook or lure.

BACKGROUND OF THE INVENTION

It is well known that fishing weights or sinkers are attached to fishing lines to submerge a baited hook or lure in the water to attract a fish thereto. A variety of means have been employed with varying degrees of success, some of which have been recited in my above noted parent patent application.

The sinker device of the present invention provides means to permit a rapid change of sinkers to suit the fishing conditions, without the untying or tying of knots, and more importantly, the cutting of the fishing line, as all fishermen are well aware of the difficulty of untying a monofilament line, after the knot or knots therein have been pulled tight.

SUMMARY OF THE INVENTION

With the foregoing in mind, one of the principal objects of the present invention is to provide a guide attachment or release means for a fishing weight, relative to a fishing line.

A further principal object of the invention is to provide a quick attachment and release means for a fishing weight which does not require the typing of knots or the crimping of weights on the line.

Yet another object of the invention is to provide a weight of the above type which may be readily attached to fishing lines within a very wide range of thicknesses, that is, within a range from very fine lines of a very few pounds test, up to thick lines of very substantial pound test, for the taking of very large fish.

Another object of the invention is to provide a readily attachable and quick release fishing weight which is inexpensive to manufacture and easy to use.

An additional object of the invention is to provide a fishing weight which will not be displaced along the length of the fishing line, while in use.

A further object of the invention is to provide a fishing weight which can be reused numerous times without damage either to the weight or the fishing line.

Yet another object of the invention is to provide a fishing sinker which requires no tools for attachment or release relative to a fishing line, will not deteriorate with use, and requires no substantial degree of manual dexterity for attachment or removal operations.

Other objects and advantages will become more fully apparent to those skilled in the art upon reading the followdescriptions with reference to the accompanying drawings.

In accordance with the invention there is provided a fishing weight or sinker which has an axis essentially coincident with the fishing line on which it is used. The main body of the weight is comprised of a material having a specific gravity substantially greater than one, such as lead, and includes an axial channel with a first cross sectional configuration extending from a first end thereof, and opening into an enlarged channel portion at a second end with a second cross sectional configuration. A bushing is exteriorly sized and configured for press fitted engagement within the length of the two channel portions, and includes an interior screwthreaded bore portion extending from the first end to a tapered portion, somewhat inward of the second end which terminates in a keyhole slot at the second end. The keyhole slot opens radially outward at the second end in alighment with coincident slots opening radially outward through the length of the bushing and main body. A longitudinally slotted screw core including tapered inner end side portions engageable in the bushing bore in a manner whereby a fishing line engaged therethrough may be selectively secured or released relative to the weight by proper rotational actuation of an outward extension of the core at the first end.

The invention will be better understood upon reference to the drawings and detailed description in which:

BRIEF DESCRIPTION OF THE DRAWINGS

FIG. 1 is a plan view of the fishing weight of the present invention;

FIG. 2 is a cross sectional view taken generally along line 2—2 of FIG. 1 with a fishing line slot therein in an open position;

FIG. 3 is a view similar to FIG. 2 with a slot in a closed position;

FIG. 4 is a longitudinal sectional view taken along line 4—4 of FIG. 2, in the slot open position;

FIG. 5 is a longitudinal sectional view taken along line 5—5 of FIG. 3, in the slot closed position;

FIG. 6 is a first end view of FIG. 1 as seen along line 6—6 thereon;

FIG. 7 is a second end view as seen along line 7—7 of FIG. 1; and

FIG. 8 is a substantially enlarged end view of the internal screwthreaded core element of the fishing weight.

DETAILED DESCRIPTION

With reference to the drawings and particularly to FIGS. 1 and 2, the fishing weight assembly of the present invention, indicated generally at 10, includes a main body portion, indicated generally at 12, formed of a suitable high specific gravity material, such as lead. The main body portion may be generally egg-shaped, as illustrated, however other shapes can be utilized.

An axial channel 14 is formed along a major length of the main axis of 12, from a first end 16 thereof, and a minor, radially enlarged channel portion 18, from channel 14, is formed at a second end thereof. A correspondingly formed bushing member 20 is press fitted into channel portions 14 and 16.

As illustrated in FIGS. 2 and 5, the majority of the length of channel 14 is generally round in cross section, and the enlarged minor channel portion 18, is off-round, such as the hexagonal configuration, illustrated in FIG. 7, for a purpose to be hereinafter explained.

Bushing member 20, as described is correspondingly formed at 22 relative to round channel portion 14, and hexagonal at a second end at 23, relative to channel portion 18, FIG. 7, whereby the bushing member 20 is keyed against rotational dislocation or longitudinal movement when press fitted into the respective channel portions 14 and 18. The main body portion 12 is radially through slotted along its length as at 30, in an aligned relation to a like longitudinal slot 34 in bushing member 20.

Bushing member 20 includes an interior bore 36, FIGS. 4 and 5 which is threaded at 38 in a first end portion, and an inner tapered portion at 40, adjacent a second end. The second end defines a key hole slot 42 in hexagonal portion 23, providing an enlarged rounded portion 46 on the main axis of weight assembly 10.

A core member 50 is exteriorly threaded at 52 for interior engagement in threads 38 and includes an extended enlarged exterior finger grip portion 64 at a first end. A predetermined length of the radially first end portion of core member 50 is radially slotted at 56 to a depth somewhat beyond the axis of the fishing weight assembly 10, and an inner second length portion of core member 50 is diametrically slotted at 58 to define a pair of flexible fingers 60, 62, FIGS. 4, 5 and 8. The inner distal end portions of fingers 60, 62 are tapered at 64, 66, on opposed edges, relative to inner taper 40 of bushing member 20.

With further reference to FIG. 8, it is to be noted that the side edges of fingers 60, 62 adjacent the diametric slot 58, are tapered at 64, 66 and the end portion diameter of fingers 60, 62, indicated at 68, 70, at ninety degrees to the slot 58, are not tapered.

With reference to FIGS. 2 and 4 a fishing line L is inserted into an axial relation within the sinker assembly 10, through the access slot 30 in body portion 12, slot 34 in bushing member 20, and keyhole slot 46 to the position within the aligned core slots 56, 58, and extending outwardly thereof at both ends. When the core 50 is screw threaded inwardly about the fishing line L, the fingers 60, 62 are flexed inwardly by engagement of the finger portions 68, 70 with the interior bushing taper 40 to engage and clamp the line L against axial movement relative to the fishing weight assembly 10. The dimensions of the various slots and the rounded head portion 46 of keyhole slot 44 are such as to accommodate a very wide range of fishing line thicknesses. When line L is so clamped, the core slot 56, 58 is disaligned relative to main body and bushing slots 30, 34 as in FIGS. 3 and 5.

The bushing member 20 and core member 50 are preferably formed of a suitable plastic material to avoid nicking the fishing line, and the sinker assembly 10 is quickly adjustable and readjustable to any desired portions along the fishing line L.

Having described the presently preferred embodiments of the invention, it should be understood that various changes in construction and arrangement will be apparent to those skilled in the art and are fully contemplated there with departing from the true spirit of the invention. Accordingly, there are covered all alternatives, modifications and equivalents as may be included within the spirit and scope of the invention as defined herein solely by the appended claims.

What is claimed is:

1. An improved fishing weight comprising
    a main body, having an axis, with a specific gravity greater than one, formed witth a first axial channel and a connecting outer radially extending slot therein;
    a bushing secured in said first axial channel formed with a second axial channel including a tapered female socket portion and connecting inner radially extending slot therein in an aligned relation to the outer radially extending slot;
    a core member in axial adjustable screw threaded engagement within said second axial channel, formed with axially extending slot means therethrough, having an outwardly extending end portion with a slot along only its radius, and having an inwardly extending end portion comprising a plurality of durable flexible finger tapered, male portions integral with said outwardly extending end portion, defining at least one diametrically disposed slot;
    means to selectively clamp with adjustable pressure a length of line in a generally axially extending relation through said axially extending slot means by manual operation of the screw threaded engagement to flex into contact with the line the flexible finger by cooperation between the tapered male portions of the flexible fingers and the tapered female socket portion of the bushing.

2. The fishing weight as defined in claim 1 wherein the axially extending slot means includes a first length thereof which extends radially inward to a predetermined depth.

3. The fishing weight as defined in claim 1 wherein the screw threaded engagement is defined by a mating engagment of interior and exterior screw threaded portion, respectively of the bushing and core.

4. The fishing weight as defined in claim 1 wherein the core includes an outwardly extended screw threaded portion, beyond a first end of said main body, including an enlarged finger grip end portion.

5. The fishing weight as defined in claim 1 wherein a main length of the bushing is generally cylindrical in form for press fitted engagement in a corresponding, generally cylindrical hole through a main length of the main body portion.

6. The fishing weight as defined in claim 1 wherein the bushing includes a minor off-round end-length for engagement in a correspondingly formed end recess in the main body portion.

7. The fishing weight as defined in claim 6 wherein the off-round end length and recess are hexagonal.

8. The fishing weight as defined in claim 7 including a key hole slot through the end length in general axial alignment with the outer and inner radially extending slots.

9. The fishing weight as defined in claim 1 wherein the bushing and core are molded from a tough, deterioration resistant, water insoluble, substantially incompressible, resilient polymer.

10. An improved fishing weight comprising:
    a main body, having an axis, with a specific gravity greater than one, formed with a first axial channel and a connecting outer radially extending slot therein;
    a bushing secured in said first axial channel by having a generally cylindrical main length for press fitted engagement in a corresponding, generally cylindrical hole through a main length of the main body, said bushing including a minor off-round end-length for engagement in a correspondingly formed end recess in the main body, said bushing formed with a second axial channel and connecting inner radially extending slot therein in an aligned relation to the outer radially extending slot;
    a core member in axial adjustable screw threaded engagement within said second axial channel, formed with axially extending slot means therethrough; and means to clamp a length of line, such as a fishing line, in a generally axially extending relation through said axially extending slot means.

11. The fishing weight as defined in claim 10 wherein the axially extending slot means includes a first length thereof which extends radially inward to a predetermined depth.

12. The fishing weight as defined in claim 11 wherein the axially extending slot means further includes a second length thereof, opening from the first length through an inwardly extended end portion of the core.

13. The fishing weight as defined in claim 12 wherein the second length is diametrically formed through the core.

14. The fishing weight as defined in claim 10 wherein the screw threaded engagement is defined by a mating engagement of interior and exterior screw threaded portions, respectively of the bushing and core.

15. The fishing weight as defined in claim 13 wherein the core inwardly extended end portion comprises a pair of fingers, defined by the diametrically formed second slot length, the fingers including flexible, tapered distal end male portions.

16. The fishing weight as defined in claim 15 wherein the second axial channel includes a female, tapered socket portion, positioned relative to the male tapered distal end portions for cooperation therewith to define the clamp means whereby the length of fishing line extending through the slot means may be selectively clamped in place or released by proper manual operation of the screw threaded engagement, to engage or disengage the flexible male portions relative to the female portion.

17. The fishing weight as defined in claim 10 wherein the core includes an outwardly extended screw threaded portion, beyond a first end of said main body, including an enlarged finger grip end portion.

18. The fishing weight as defined in claim 10 wherein the off-round end length and recess are hexagonal.

19. The fishing weight as defined in claim 18 including a key hole slot through the end length in general axial alignment with the outer and inner radially extending slots.

20. The fishing weight as defined in claim 10 wherein the bushing and core are molded from a tough, deterioration resistant, water insoluble, substantially incompressible, resilient polymer.

* * * * *